(12) United States Patent
Yoshida

(10) Patent No.: US 6,930,877 B2
(45) Date of Patent: Aug. 16, 2005

(54) ANODE MEMBER FOR A SOLID ELECTROLYTIC CAPACITOR, SOLID ELECTROLYTIC CAPACITOR USING THE ANODE MEMBER, AND METHOD OF PRODUCING THE ANODE MEMBER

(75) Inventor: Katsuhiro Yoshida, Sagamihara (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/757,607

(22) Filed: Jan. 13, 2004

(65) Prior Publication Data

US 2004/0150942 A1 Aug. 5, 2004

(30) Foreign Application Priority Data

Feb. 4, 2003 (JP) ........................................ 2003-026724

(51) Int. Cl.[7] ................................................ H01G 9/00
(52) U.S. Cl. ...................... 361/523; 361/516; 361/519; 361/525; 361/528; 361/529; 29/25.03
(58) Field of Search .................................. 361/523, 525, 361/528, 529, 530, 516, 519, 520, 534, 535, 538

(56) References Cited

U.S. PATENT DOCUMENTS 4,494,299 A * 1/1985 Franklin et al. ............ 29/25.03
6,320,742 B1 * 11/2001 Wada et al. ................. 361/528

FOREIGN PATENT DOCUMENTS

JP 59-219923 A 12/1984

* cited by examiner

Primary Examiner—Dean A. Reichard
Assistant Examiner—Nguyen T. Ha
(74) Attorney, Agent, or Firm—Frishauf, Holtz, Goodman & Chick, P.C.

(57) ABSTRACT

An anode member is provided which includes a valve metal thin plate and a valve metal powder layer formed on at least one plate surface of the valve metal thin plate. At least one groove is formed in the valve metal powder layer, and the valve metal under powder layer having the at least one groove formed therein is sintered to form the anode member.

17 Claims, 3 Drawing Sheets

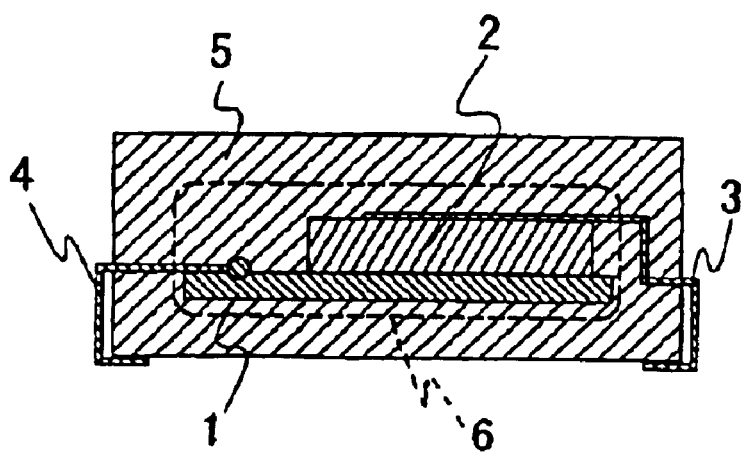
FIG. 1 EXISTING ART

METAL NIOBIUM POWDER HAVING
AVERAGE PARTICLE SIZE OF 0.3μm

ANODE MEMBER FOR A SOLID ELECTROLYTIC CAPACITOR, SOLID ELECTROLYTIC CAPACITOR USING THE ANODE MEMBER, AND METHOD OF PRODUCING THE ANODE MEMBER

This application claims priority to prior Japanese application JP 2003-26724, the disclosure of which is incorporated herein by reference.

BACKGROUND OF THE INVENTION

This invention relates to an anode member for a solid electrolytic capacitor and, in particular, to an anode member including a valve metal thin plate as an anode lead and a sintered layer formed on a surface of the thin plate, a solid electrolytic capacitor having the anode member, and a method of producing the anode member.

An electrolytic capacitor comprises a metal acting as an anode and a dielectric oxide film formed on a surface thereof by anodic oxidation. The dielectric oxide film is brought into contact with an electrolytic solution or a solid electrolyte acting as an opposite electrode to accumulate electric charges between the anode and the opposite electrode. Because the electrolytic capacitor is small in size and large in capacity, the electrolytic capacitor is already put into practical use and research and development are continuously made for the purpose of further improvement in characteristics. As the metal to be subjected to anodic oxidation, a so-called valve metal is used.

For example, in a solid electrolytic capacitor using the valve metal, such as tantalum (Ta) or niobium (Nb), the valve metal for the anode is often used in the form of a sintered product having a porous structure so that the anode has a large specific surface area and, consequently, the capacitor has a large capacitance. In order to obtain the sintered product, a powder of the valve metal is press-formed into a desired shape and then sintered in a vacuum at a high temperature.

Generally, the sintered product having a circular cylindrical or a rectangular cylindrical shape is used in the solid electrolytic capacitor. For convenience of description, the solid electrolytic capacitor of the type may be called a cylindrical solid electrolytic capacitor. On the other hand, Japanese Patent Application Publication No. S59-219923 (JP 59-219923 A) discloses a solid electrolytic capacitor comprising a valve metal thin plate or foil and a valve metal sintered layer formed on a surface of the thin plate. For convenience of description, the capacitor of the type will be called a foil-type solid electrolytic capacitor.

In the foil-type electrolytic capacitor disclosed in the above-mentioned publication, an anode member is formed by preparing the valve metal thin plate as an anode lead, applying a valve metal powder onto the surface of the anode lead to a desired thickness, and then sintering the valve metal powder into the valve metal sintered layer.

Hereinafter, the foil-type solid electrolytic capacitor disclosed in the above-mentioned publication will be described in conjunction with an Nb solid electrolytic capacitor by way of example. It is well known in the art that, in the foil-type solid electrolytic capacitor, the sintered product of the valve metal electrically serves as the anode. In the following description, the valve metal thin plate and the valve metal sintered layer formed on the surface thereof may collectively be called an anode member.

For example, the foil-type solid electrolytic capacitor using Nb comprises an Nb foil as the valve metal thin plate, an Nb powder sintered layer as the valve metal sintered layer, an Nb oxide thin film, a solid electrolyte layer, an external anode terminal, an external cathode terminal, and a resin package. A combination of the Nb foil and the Nb powder sintered layer forms an Nb foil anode member.

In the foil-type solid electrolytic capacitor, the Nb powder sintered layer is formed on the surface of the Nb foil. The Nb powder sintered layer has a porous structure with microscopic holes formed inside and therefore has a very large specific surface area. On an outer surface of the Nb powder sintered layer and on a surface of an inner wall of each microscopic hole formed inside, the Nb oxide thin film is formed by anodic oxidation. The Nb oxide thin film serves as a dielectric member of the capacitor.

On a surface of the Nb oxide thin film, the solid electrolyte layer is formed. The solid electrolyte layer serves as a cathode of the capacitor. A combination of the Nb powder sintered layer as the anode, the Nb oxide film as the dielectric member, and the solid electrolyte layer as the cathode forms a fundamental structure of the capacitor.

On a surface of the solid electrolyte layer, a conductive substance layer is formed and called a cathode conductor layer. The cathode conductor layer comprises, for example, a graphite layer and a silver paste layer successively deposited. A combination of the solid electrolyte layer and the cathode conductor layer may be called a cathode layer. To the outermost layer of the cathode conductor layer, the external cathode terminal is fixedly attached for electrical connection with the outside. On the other hand, the Nb foil has an exposed part where the Nb powder sintered layer is not formed thereon. The external anode terminal for electrical connection with the outside is fixedly attached to the exposed part.

Furthermore, the resin package comprising epoxy resin or the like covers the Nb foil, the Nb powder sintered layer, a part of the external cathode terminal, and a part of the external anode terminal. Another part of each of the external cathode terminal and the external anode terminal which is not covered with the resin package is shaped along the resin package, i.e., folded downward along a side surface of the resin package and further folded inward onto a bottom surface of the resin package.

In the foil-type solid electrolytic capacitor having the above-mentioned structure, the Nb foil serves to electrically connect the Nb powder sintered layer as the anode of the capacitor and the external anode terminal. Thus, the Nb foil corresponds to a metal wire which is embedded in the cylindrical sintered product in the cylindrical solid electrolytic capacitor and generally called the anode lead.

The foil-type solid electrolytic capacitor mentioned above is advantageous in reduction in size and thickness of the capacitor because the anode member is easily reduced in thickness as compared with the cylindrical solid electrolytic capacitor. Since the contact area between the Nb foil as the anode lead and the Nb powder sintered layer as the anode is increased so that the resistance therebetween is decreased, it is possible to reduce ESR (Equivalent Series Resistance) of the capacitor.

As compared with the cylindrical solid electrolytic capacitor, the foil-type solid electrolytic capacitor has the above-mentioned advantages. However, the foil-type solid electrolytic capacitor is disadvantageous in that production is difficult as compared with the cylindrical solid electrolytic capacitor in the reasons which will hereinafter be described.

The anode member of the foil-type solid electrolytic capacitor is obtained by preparing the Nb foil as the valve metal thin plate, depositing an Nb powder layer on the surface of the Nb foil, for example, by applying a paste with Nb powder particles dispersed therein, and sintering the Nb powder layer.

Generally, the sinterability of a metal powder, i.e., the degree of cohesion or fusion of the powder particles forming the powder, or the degree of growth of the powder particles is widely different depending upon the situation. Specifically, the sinterability at a boundary between the particles within the Nb powder layer is widely different from the sinterability at an interface between the particles and a metal object such as a metal foil or a metal thin plate. It is known that, even at the same temperature, sintering is quickly promoted between the powder particles while the growth or the fusion of the particles is difficult or slow between the powder particles and the metal foil or the like.

It is assumed that, in the anode member of the Nb foil-type electrolytic capacitor, a relatively low sintering temperature is selected, focusing upon the porosity of the Nb powder sintered layer. In this event, an excellent sintered condition is obtained in a region inside the Nb powder sintered layer. On the other hand, at the interface between the Nb foil and the Nb powder sintered layer, sintering is insufficient so that the fusion or the cohesion between the Nb foil and the Nb powder sintered layer is weak. This results in frequent occurrence of defective products due to separation or release of the Nb powder sintered layer from the Nb foil during handing in a production process. In addition, the capacitor is deteriorated in leakage current characteristic.

In order to avoid the trouble during the production process and the deterioration in characteristic of the capacitor as a result of the relatively low sintering temperature, the sintering temperature is elevated so as to promote and enhance the fusion or the cohesion at the interface between the Nb foil and the Nb powder sintered layer. In this event, however, the Nb powder sintered layer is over-sintered and significantly deformed due to shrinkage following the progress of sintering, resulting in occurrence of separation and cracks. In case of such significant deformation, the dimensional accuracy of a half product or a final product is difficult to satisfy. In addition, in various steps in the production process, mechanical stress is often caused to occur at portions deformed in the sintering. This results in an increase in frequency of occurrence of destruction of the Nb oxide film and a degradation in leakage current characteristic of the capacitor. In most cases, cracked portions are associated with much significant deformation so that the above-mentioned troubles are more likely to occur.

Thus, for the anode member of the foil-type solid electrolytic capacitor, it is necessary to accurately control the sintering temperature in the sintering step to an appropriate sintering temperature. However, depending upon the variation in powder particle size and particle size distribution per each material lot, the appropriate sintering temperature is different to determine. Therefore, it is extremely difficult to accurately control the sintering temperature in the production process. In addition, the deformation and the cracks mentioned above are more prominent as the thickness of the powder sintered layer is increased. Therefore, the thickness of the powder sintered layer is restricted so that the capacitance of the capacitor can not be increased.

On the other hand, the anode member of the cylindrical solid electrolytic capacitor does not use the foil but uses the metal wire as the anode lead. The anode lead comprising the metal wire is surrounded by the Nb powder. When the Nb powder is press-formed into a cylindrical shape, the anode lead and the Nb powder are press bonded to each other. Thus, at a stage prior to sintering, the cohesion between the anode lead and the Nb powder is already strong. Even if sintering is carried out at a relatively low temperature so as to assure the porosity, the cohesion between the anode lead and the powder sintered product after sintering is sufficiently strong as compared with anode member of the foil-type solid electrolytic capacitor. In addition, the press-forming has an effect of uniformizing the density of powder particles within a press-formed product so that the deformation is minimized even if the sintering temperature is elevated.

As described above, the anode member of the foil-type solid electrolytic capacitor has production difficulty in the process of sintering.

SUMMARY OF THE INVENTION

It is therefore a technical object of this invention to provide an anode member for a foil-type solid electrolytic capacitor, which is suppressed in deformation even if a sintering step of the anode member is carried out at a relatively high temperature required to achieve sufficient fusion between a valve metal powder layer and a valve metal thin film and which is suppressed in deformation following occurrence of cracks.

It is another object of this invention to provide a method of producing the above-mentioned anode member.

It is still another object of this invention to provide a solid electrolytic capacitor using the above-mentioned anode member.

In order to achieve the above-mentioned objects, the present inventors studied to provide a valve metal powder layer formed on the surface of a valve metal thin plate with a structure in which deformation due to shrinkage during sintering does not propagate over a whole of the powder layer.

According to this invention, there is provided an anode member for a solid electrolytic capacitor, the anode member comprising a valve metal thin plate and a valve metal powder layer formed on at least one surface of the valve metal thin plate and sintered, wherein the valve metal powder layer has a groove.

In the above-mentioned anode member, the groove has a depth corresponding to 20% or more of the thickness of the valve metal powder layer.

According to this invention, there is also provided a solid electrolytic capacitor comprising the above-mentioned anode member, a cathode, and a dielectric member.

According to this invention, there is also provided a method of producing a solid electrolytic capacitor, the method comprising the steps of forming a valve metal powder layer on at least one surface of a valve metal thin plate and sintering the powder layer, wherein the powder layer is provided with a groove prior to the sintering.

In the anode member for a solid electrolytic capacitor according to this invention, the groove is formed in the valve metal powder layer formed on the surface of the valve metal thin plate. Therefore, the shrinkage of the valve metal powder layer as a result of sintering is independently caused in each individual section separated by the groove. Thus, the deformation does not propagate over a whole of the valve metal powder layer.

Accordingly, the anode member obtained by sintering the valve metal powder layer has a sufficient thickness as the anode member and is minimized in occurrence of cracks and separation at the interface between the valve metal powder layer and the valve metal thin plate.

In this invention, the depth of the groove formed in the valve metal powder layer may be so small as far as a recessed portion is formed in the layer even if it is very shallow. In a printing step, however, unevenness may unintentionally be formed on a printed surface. The depth distinguishable from such unintentional unevenness is 20% or more of the thickness of the layer. Therefore, the depth must be equal to or greater than 20% of the thickness of the layer.

Further structures and merits of this invention will become clear as the description proceeds.

BRIEF DESCRIPTION OF THE DRAWINGS

FIG. 1 is a sectional view of an existing foil-type solid electrolytic capacitor;

DESCRIPTION OF THE PREFERRED EMBODIMENT

Figure 2A:
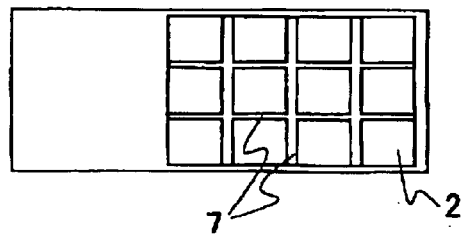
FIGS. 2A and 2B are a plan view and a side view for describing an anode member for a foil-type solid electrolytic capacitor according to an embodiment of this invention, respectively.

In order to facilitate an understanding of this invention, the existing technique mentioned above will be described at first.

Referring to FIG. 1, a foil-type solid electrolytic capacitor using Nb comprises a Nb foil 1, a Nb powder sintered layer 2, an external cathode terminal 3, an external anode terminal 4, and a resin package 5. A combination of the Nb foil 1 and the Nb powder sintered layer 2 forms an Nb foil-type anode member 6.

In the foil-type solid electrolytic capacitor, the Nb powder sintered layer 2 is formed on a surface of the Nb foil 1, as illustrated in FIG. 1. The Nb powder sintered layer 2 has a porous structure with microscopic holes formed inside and therefore has a very large specific surface area. On an outer surface of the Nb powder sintered layer 2 and a surface of an inner wall of each microscopic hole formed inside, an Nb oxide thin film (not shown) is formed by anodic oxidation. The Nb oxide thin film serves as a dielectric member of the capacitor.

On a surface of the Nb oxide thin film, a solid electrolyte layer (not shown) is formed. The solid electrolyte layer serves as a cathode of the capacitor. A combination of the Nb powder sintered layer 2 as the anode, the Nb oxide film as the dielectric member, and the solid electrolyte layer as the cathode forms a fundamental structure of the capacitor.

On a surface of the solid electrolyte layer, a conductive substance layer (not shown) is formed and called a cathode conductor layer. The conductive conductor layer comprises, for example, a graphite layer and a silver paste layer successively deposited. To the outermost layer of the cathode conductor layer, the external cathode terminal 3 is fixedly attached for electrical connection with the outside. On the other hand, the Nb foil 1 has, at a left side in the figure, an exposed part where the Nb powder sintered layer 2 is not formed thereon. The external anode terminal 4 for electrical connection with the outside is fixedly attached to the exposed part.

Further, the resin package 5 comprising epoxy resin or the like covers the Nb foil 1, the Nb powder sintered layer 2, a part of the external cathode terminal 3, and a part of the external anode terminal 4. Another part of each of the external cathode terminal 3 and the external anode terminal 4 which is not covered with the resin package 5 is shaped along the resin package 5, i.e., folded downward along a side surface of the resin package 5 and further folded inward onto a bottom surface of the resin package 5.

In the foil-type solid electrolytic capacitor having the above-mentioned structure, the Nb foil 1 serves to electrically connect the Nb powder sintered layer 2 as the anode of the capacitor and the external anode terminal 4. Thus, the Nb foil 1 corresponds to a metal wire which is embedded in the cylindrical sintered product in the cylindrical solid electrolytic capacitor and generally called the anode lead.

Generally, the above-mentioned foil-type solid electrolytic capacitor using Nb is produced in the following manner. At first, a powder of a metal Nb, a solvent, and a binder are mixed to form a paste. The solvent and the binder are appropriately selected taking the compatibility into consideration. For example, a water-soluble binder is selected for a water-based solvent.

Next, the above-mentioned paste is printed on the Nb foil 1 to form an Nb powder layer. As a printing mask, a screen mask, or a metal mask may be used. When a small printing thickness is desired, the screen mask is appropriate. On the other hand, when a large printing thickness is desired, the metal mask is appropriate.

Then, the Nb foil 1 with the Nb powder layer formed thereon is sintered in a vacuum, for example, on the order of $10^{-4}$ Pa at a temperature lower than the melting point of the metal Nb, for example, at a temperature between 1000 and 1200° C. to obtain the anode member 6 comprising the Nb foil 1 and the Nb powder sintered layer 2. Thereafter, in the manner similar to the production of the cylindrical solid electrolytic capacitor, the Nb oxide film as the dielectric member, the solid electrolyte layer, and the cathode conductor layer are formed, followed by fixation and connection of each of the external cathode terminal 3 and the external anode terminal 4, formation of the resin package 5, and shaping of each of the external cathode terminal 3 and the external anode terminal 4.

Specifically, on the outer surface of the anode member 6 obtained by the above-mentioned sintering and on the surface of the inner wall of each hole formed inside the anode member 6, oxide of the metal Nb as a raw material of the Nb powder sintered layer 2, i.e., the Nb oxide film is formed as the dielectric member. For example, the oxide of the metal Nb is formed by applying an electric voltage to the anode member in an electrolyte solution. On the surface of the Nb oxide film, the solid electrolyte layer is formed. As a solid electrolyte, use may be made of manganese dioxide obtained by thermal decomposition of manganese nitrate and a conductive polymer such as polypyrrole. In recent years, the conductive polymer is increasingly used as the solid electrolyte layer because the conductive polymer is small in intrinsic resistance so that the capacitor is reduced in equivalent series resistance (ESR) and because a heat insulating reaction is quick so that any damage due to dielectric breakdown of the capacitor is hardly caused.

Following the formation of the solid electrolyte layer, the cathode conductor layer is formed. Generally, the cathode conductor layer has a laminate structure including the graphite layer formed on the solid electrolyte layer and the silver paste layer formed on the graphite layer. The cathode conductor layer serves to electrically connect the solid electrolyte layer and the external cathode terminal 3. Furthermore, the cathode conductor layer also serves to protect the Nb oxide film as the dielectric member by relaxing the stress which would be produced during formation of the resin package 5 in the subsequent production process and upon mounting the capacitor after it is completed.

If necessary, the Nb oxide film may be re-formed between the step of forming the solid electrolyte layer and the step of forming the cathode conductor layer. Such re-formation is intended to repair a minor defect caused in the Nb oxide film due to mechanical and chemical stresses produced during formation of the solid electrolyte layer to thereby achieve a more stable characteristic of the capacitor. The re-formation is carried out in the manner substantially similar to the formation of the Nb oxide film mentioned above. Specifically, the anode member is again applied with the electric voltage in the electrolyte solution.

After formation of the cathode conductor layer, the external cathode terminal 3 is fixedly attached and electrically connected to the cathode conductor layer, for example, by adhesion using a conductive adhesive. To the exposed part of the Nb foil 1 which is exposed out of the Nb powder sintered layer 2, the external anode terminal 4 is fixedly attached by welding or the like.

Finally, the resin package 5 is formed by transfer molding using thermosetting resin such as epoxy resin. The external cathode and the external anode terminals 3 and 4 are shaped as mentioned above. Thus, the Nb foil-type solid electrolytic capacitor illustrated in FIG. 1 is completed.

The above-mentioned foil-type solid electrolytic capacitor has the advantages and the disadvantages described above in the background of the invention.

Next, this invention will be described with reference to the drawing.

Figure 2B:
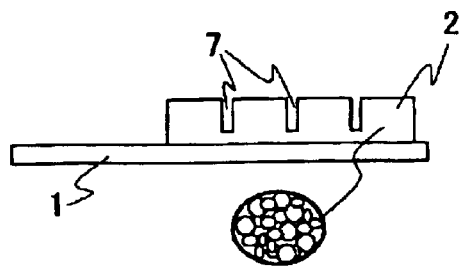

Referring to FIGS. 2A and 2B, an anode member for a foil-type solid electrolytic capacitor according to an embodiment of this invention comprises an Nb foil 1, an Nb powder sintered layer 2, and a plurality of grooves 7 in a grid-like arrangement. As illustrated in FIGS. 2A and 2B, the foil-type solid electrolytic capacitor according to this embodiment is different from the existing foil-type solid electrolytic capacitor in that the grooves 7 are formed.

The number and the interval of the grooves 7 can not theoretically be defined at this time but are determined by experimental tests and trial production. This is because optimum values are different depending upon the particle size of a valve metal, the particle size distribution, and the thickness of a powder layer.

Hereinafter, a method of producing the anode member illustrated in FIGS. 2A and 2B will be described in conjunction with specific examples.

EXAMPLE 1

At first, a paste of a metal Nb powder was prepared. Herein, the metal Nb powder having an average particle size of 0.3 μm was mixed with 8 weight % of a binder containing an acrylic polymer material and an adjusted amount of toluene as a solvent. The mixture was kneaded to obtain the paste containing Nb powder particles dispersed therein and having a viscosity of 15000±1000 Pa·s. The paste will hereinafter be called a Nb paste.

Figure 3:
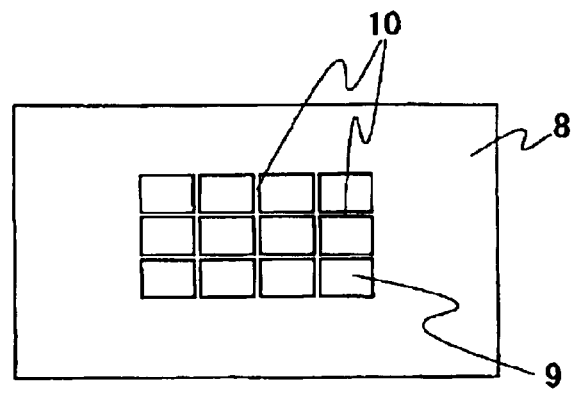
FIG. 3 is a plan view of a metal mask used in applying a Nb paste to a valve metal thin plate.

Referring to FIG. 3, a metal mask 8 illustrated in the figure was used to apply the Nb paste onto the Nb foil 1 as a valve metal thin plate. The metal mask 8 had a thickness of 100 μm. The metal mask 8 was provided with a plurality of openings 9 having a rectangular shape and separated by a grid-like portion 10 having a width of 100 μm. For example, each of the openings 9 has a size of 0.8 mm×1.0 mm. By the use of the metal mask 8, the Nb paste was printed on the Nb foil 1 and dried. As a comparative example, another Nb foil with the Nb paste printed thereon was prepared without forming a groove structure.

Figure 4A:
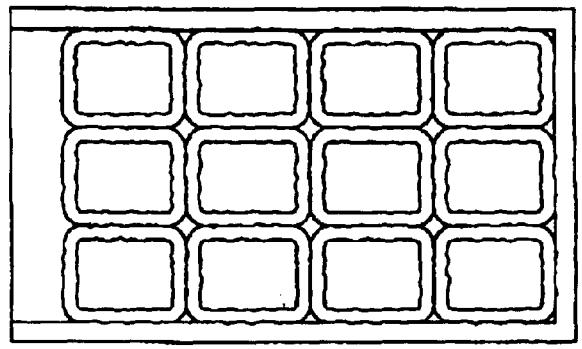
FIG. 4A shows an example of this invention in a state where the Nb paste is printed and dried.
Figure 4B:
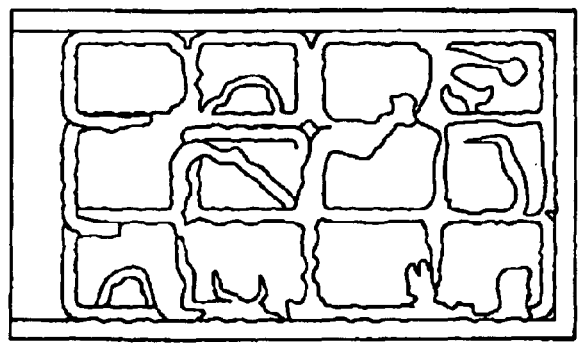
FIG. 4B shows the example of this invention in a state after sintering.
Figure 4C:
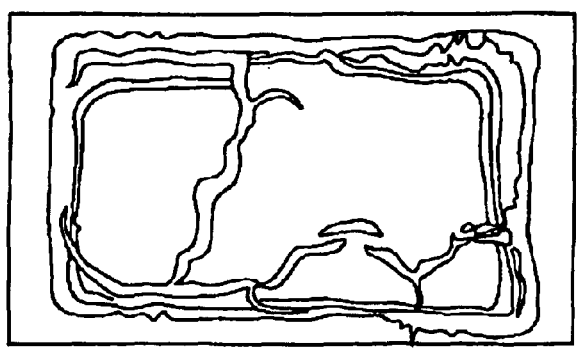
FIG. 4C shows a comparative example in a state after sintering.

Next, the Nb foil with the Nb paste printed thereon and then dried in each of the example and the comparative example was sintered in a vacuum of $10^{-3}$ Pa at a temperature of 1100° C. for 30 minutes to obtain the anode member for a solid electrolytic capacitor. Referring to FIGS. 4A through 4C, the external appearance of each of the anode members in the example and the comparative example will be described.

FIG. 4A shows the anode member of the example after the Nb paste was printed and then dried. As seen from FIG. 4A, the grooves 7 were formed on the surface of an applied film of the Nb paste. As illustrated in FIG. 4A, the Nb paste applied along the metal mask 8 may be some or less spread over an area between the opening portions 9 of the metal mask 8 because of the flowability of the paste used herein. Such spreading of the paste is not intentionally but spontaneously caused, particularly, in case of printing a thick film. Alternatively, the Nb paste may intentionally be applied to the area between the opening portions 9 in order to make the grooved portion formed under the groove 7 have some thickness. Herein, the thickness of the dried Nb paste shown in FIG. 4A was 50 to 80 μm. Further, the thickness of the grooved portion formed under the groove 7 was 0 to 50 μm. FIG. 4B shows the anode member of the example after the sintering. As seen from FIG. 4B, significant deformation or cracks were not caused on the surface of the anode member in the example. The thickness of the sintered Nb paste shown in FIG. 4B was 40 to 70 μm. Further, the thickness of the grooved portion was 0 to 50 μm. On the other hand, the comparative example in FIG. 4C exhibited remarkable deformation and cracks after the sintering.

Next, the anode member was subjected to formation of an Nb oxide film, formation of a solid electrolyte layer, and reformation of the Nb oxide film. These steps were carried out in the manner similar to those in the production process of the existing foil-type solid electrolytic capacitor. The producing conditions were as follows. The Nb oxide film was formed by anodic oxidation in a 0.6% phosphoric acid aqueous solution at 60° C. with a voltage of 16V applied. As the solid electrolyte layer, polypyrrole was used. The re-formation was carried out in a 0.1% phosphoric acid aqueous solution at 25° C. with a voltage of 16V applied.

Thereafter, in the manner similar to the production process of the existing foil-type solid electrolytic capacitor, formation of a cathode conductor layer, formation of external cathode and external anode terminals, and formation of a resin package were carried out to obtain the Nb foil-type solid electrolytic capacitor according to this invention. The capacitor thus obtained was excellent in leakage current characteristic and the like. On the other hand, in the anode member of the existing foil-type solid electrolytic capacitor, occurrence of deformation and cracks after the sintering can be suppressed if the sintering temperature is lowered. However, if the sintering temperature is lowered, defects due to separation and release will occur in the subsequent production process, resulting in deterioration of the characteristics of the capacitor. Accordingly, the production yield is very low.

The reason why occurrence of deformation and cracks on or after the sintering can be suppressed in the anode member in the example of this invention will be described. The powder layer or the powder sintered layer of the anode member for a foil-type solid electrolytic capacitor is deformed by the sintering because the stress is caused inside the powder layer due to shrinkage of the powder layer during the sintering. Once the cracks due to deformation are caused, cracked portions are pulled by shrinkage of other portions of the powder layer and further deformed because the stress balance is broken.

Generally, such deformation and cracks due to the stress tends to occur in the technique difficult to uniformize the density of the powder particles within the powder layer to be sintered, for example, in case of a layer obtained by printing a paste containing a metal powder. Therefore, in case where the powder layer is required be sintered, it is general to adopt the technique of pressing the powder layer to thereby increase and uniformize the powder density. As one example, the method of producing the cylindrical anode member described in conjunction with the prior art is known.

However, in the example of this invention, the thickness of the powder layer is small and pressing is difficult so that the above-mentioned technique of uniformizing the density is inappropriate. Under the circumstances, in this example, the powder layer formed by paste-printing is provided with a grooved portion formed under the groove to thereby disperse the stress produced during shrinkage. Thus, deformation during sintering can be suppressed. Specifically, if a large-area layer shrinks, significant deformation will be caused. However, such a large-area layer is divided into small sections, the shrinkage occurs in each individual section and the magnitude of the shrinkage in each section is small. This state is analogous to uniform shrinkage of a whole of the layer. Thus, deformation is suppressed and cracks are small in the powder layer as a whole.

In this embodiment, the above-mentioned division is achieved by formation of the grooved portion. From the above-mentioned reason, the grooved portion is effective to some extent as far as it is present. A thickness of the grooved portion being thinner or a depth of the groove on the grooved portion being deeper achieves a greater contribution to the stress relaxation. However, it is difficult to theoretically predict an appropriate ratio of the thickness of the grooved portion with respect to the average thickness of the powder layer because the ratio providing a remarkable effect is varied depending upon the material of the powder and the particle size distribution.

In this invention, the depth of the groove is equal to or greater than 20% of the powder layer. This is because an unevenness is unintentionally produced on the surface of the powder layer formed by paste-printing and the depth of such a natural depression may possibly reach about 20% of the thickness of the powder layer. With the depth equivalent to such a natural depression, the effect of this invention can not be expected.

Next, the upper limit of the thickness of the grooved portion and the lower limit of the thickness of powder layer will be described.

In case of the Nb paste used in this example, it has experimentally been confirmed that, if the printing thickness of the powder layer is not greater than 50 $\mu$m, occurrence of cracks are substantially suppressed. However, it has experimentally been confirmed also that, if the thickness of the powder layer is not greater than 50 $\mu$m, the weight of the powder, i.e., the capacitance of the capacitor can not be increased. Thus, the thickness not greater than 50 $\mu$m advantageously suppresses occurrence of cracks but disadvantageously inhibits the increase in capacitance.

From the above, it is appropriate that the thickness of the powder layer except the grooved portion is greater than 50 $\mu$m in order to assure a sufficient capacitance while the thickness of the grooved portion is not greater than 50 $\mu$m in order to avoid occurrence of cracks in the grooved portion itself.

The thickness of the grooved portion after printing was actually observed and fell within a range between 0 and 50 $\mu$m.

Although the thickness of the grooved portion is not greater than 50 $\mu$m, the weight of the powder and the capacitance of the capacitor can be sufficiently ensured because the area and the volume of the powder layer are much greater than those of the grooved portion.

As a result, the appearance of the foil-type anode member was as illustrated in FIG. 4B. It is understood that the thickness of the grooved portion was appropriate.

EXAMPLE 2

As a different method of producing the grooved portion of the anode member, the grooved portion may be formed in the Nb powder layer or Nb paste layer after paste-printing. In Example 1, the grooved portion was formed simultaneously with the printing of the Nb paste. In Example 2, the grooved portion was formed in a separate step after the paste-printing.

The Nb paste and the Nb foil are same as those used in Example 1. However, a metal mask having a simple rectangular opening without the grid-like portion is used upon printing. After the paste is printed and dried, a grid-like object is pressed against the Nb paste layer as a printed layer. This step is generally called stamping. Alternatively, the surface of the printed layer is subjected to marking, scribing, or rooting using a sharp-pointed tool. Thus, the grooved portion is formed.

Herein, the grooves were formed by marking. The thickness of the grooved portion is not greater than 50 $\mu$m as described in conjunction with Example 1. The subsequent production process from sintering to formation of the resin package and the production conditions were similar to those described in conjunction with Example 1. The foil-type solid electrolytic capacitor thus obtained had characteristics equivalent to those of Example 1.

EXAMPLE 3

The anode member for a foil-type electrolytic capacitor was produced by the technique similar to that described in conjunction with Example 1 but using Ta as a valve metal. Thus, Example 3 is different from Example 1 only in that a metal Ta was used instead of the metal Nb in Example 1. Therefore, Example 3 is similar to Example 1 except in the composition of a Ta paste and the sintering temperature, which will presently be described.

At first, the Ta paste was prepared in the following manner. A Ta powder having an average particle size of 0.3 $\mu$m was prepared and mixed with an acrylic binder so that the weight of the binder is equal to 4% with respect to the weight of the powder. Furthermore, toluene as a solvent was mixed and the mixture was kneaded. Thus, the Ta paste having a viscosity of 15000±1000 Pa·s was prepared.

Sintering was carried out in a vacuum of $10^{-3}$ Pa or less at a temperature of 1200° C. for 30 minutes. The subsequent production process from sintering to formation of the resin package and the production conditions were similar to those described in conjunction with Example 1. As a result, the foil-type solid electrolytic capacitor having characteristics equivalent to those of Example 1 was obtained.

As described above, according to this invention, in the anode member in which the valve metal powder layer is formed on the valve metal thin plate and sintered, it is possible to suppress the deformation of the sintered layer during sintering even if sintering is carried out at a relatively high temperature assuring the sufficient fusion between the metal powder sintered layer and the metal thin plate. As a result, the yield and the characteristic of the capacitor can be improved.

Therefore, upon occurrence of mechanical stress in the subsequent process, a trouble such as breakage of the film such as the Nb oxide film as the dielectric member hardly occurs. It is therefore possible to reduce occurrence of the defective products. By the above-mentioned effects, the thickness of the powder layer can be increased as compared with the existing capacitor so that the capacitance of the capacitor can be increased.

So far, this invention has been described in conjunction with several examples. However, it will readily be understood for those skilled in the art that this invention is not restricted to the examples mentioned above but may be modified in various manners within the scope of this invention.

What is claimed is:

1. An anode member for a solid electrolytic capacitor, said anode member comprising:
    a valve metal thin plate;
    a valve metal powder layer formed on at least one plate surface of said valve metal thin plate; and
    at least one groove formed in said valve metal powder layer;
    wherein said valve metal powder layer having the at least one groove formed therein is sintered to form the anode member.

2. An anode member as claimed in claim 1, wherein said groove has a depth corresponding to at least 20% of a thickness of said valve metal powder layer.

3. An anode member as claimed in claim 1, further comprising a grooved portion corresponding to a portion of said valve metal powder layer that is under said at least one groove;
    wherein said grooved portion has a thickness of not more than 50 $\mu$m.

4. An anode member as claimed in claim 1, wherein said valve metal powder layer has a thickness of at least 50 $\mu$m.

5. An anode member as claimed in claim 1, wherein said groove is formed by masking the plate surface of the valve metal thin plate and depositing said valve metal powder layer on the masked plate surface.

6. An anode member as claimed in claim 1, wherein said groove is formed by depositing the valve metal powder layer on the plate surface and stamping said valve metal powder layer.

7. An anode member as claimed in claim 1, wherein said groove is formed by depositing the value metal Powder layer on the plate surface and marking said valve metal powder layer.

8. An anode member as claimed in claim 1, wherein said valve metal is one of niobium (Nb) and tantalum (Ta).

9. A solid electrolytic capacitor comprising the anode member as claimed in claim 1, a cathode, and a dielectric member.

10. A method of producing an anode member for a solid electrolytic capacitor, said method comprising:
    forming a valve metal powder layer on at least one plate surface of a valve metal thin plate, and forming at least one groove in said valve metal powder layer; and
    sintering said valve metal powder layer having the at least one groove formed therein.

11. A method of producing the anode member for the solid electrolytic capacitor as claimed in claim 10, wherein the groove has a depth corresponding to at least 20% of a thickness of the valve metal powder layer.

12. A method of producing the anode member for the solid electrolytic capacitor as claimed in claim 10, wherein a portion of said valve metal powder layer that is under said at least one groove forms a grooved portion; and
    wherein said grooved portion has a thickness of not more than 50 $\mu$m.

13. A method of producing the anode member for the solid electrolytic capacitor as claimed in claim 10, wherein the valve metal powder layer has a thickness of at least 50 $\mu$m.

14. A method of producing the anode member for the solid electrolytic capacitor as claimed in claim 10, wherein the valve metal powder layer and the at least one groove formed therein are formed by masking the plate surface of the valve metal thin plate and depositing a valve metal powder on the masked plate surface.

15. A method of producing the anode member for the solid electrolytic capacitor as claimed in claim 10, wherein the valve metal powder layer and the at least one groove formed therein are formed by depositing a valve metal powder on the plate surface of the valve metal thin plate and forming the at least one groove by stamping the valve metal powder deposited on the plate surface.

16. A method of producing the anode member for the solid electrolytic capacitor as claimed in claim 10, wherein the valve metal powder layer and the at least one groove formed therein are formed by depositing a valve metal powder on the plate surface of the valve metal thin plate and forming the at least one groove by marking the valve metal powder deposited on the plate surface.

17. A method of producing the anode member for the solid electrolytic capacitor as claimed in claim 10, wherein the valve metal is one of niobium (Nb) and tantalum (Ta).

* * * * *